United States Patent [19]
Stout

[11] Patent Number: 5,219,466
[45] Date of Patent: Jun. 15, 1993

[54] TIRE CHAIN AND CABLE MOUNTING APPARATUS

[76] Inventor: Odie Stout, 321 Harding Ave., Sacramento, Calif. 95833

[21] Appl. No.: 894,110

[22] Filed: Jun. 5, 1992

[51] Int. Cl.⁵ .................... B60C 27/06; B66F 19/00
[52] U.S. Cl. ............................ 152/213 R; 81/15.8; 254/88
[58] Field of Search ............... 152/213 R; 81/15.8; 254/88

[56] References Cited

U.S. PATENT DOCUMENTS

| | | | |
|---|---|---|---|
| 1,067,940 | 7/1913 | Rohe et al. | 152/213 R |
| 1,121,869 | 12/1914 | Rohe et al. | 152/213 R |
| 1,189,632 | 7/1916 | Seitz | 152/213 R |
| 2,022,804 | 12/1935 | Garey | 81/15.8 X |
| 2,532,149 | 11/1950 | Cone | 81/15.8 |
| 3,893,500 | 7/1975 | Planz | 152/213 R |
| 3,937,263 | 2/1976 | Hill et al. | 152/213 R |
| 4,031,939 | 6/1977 | DeMartini | 152/213 R |
| 4,103,870 | 8/1978 | Murakami | 152/213 R X |
| 4,194,724 | 3/1980 | Masegian | 152/213 R X |

*Primary Examiner*—Michael W. Ball
*Assistant Examiner*—Francis J. Lorin
*Attorney, Agent, or Firm*—James M. Ritchey

[57] ABSTRACT

Disclosed is a mounting apparatus for installing either a tire chain or a tire cable onto a tire of a vehicle. Included is a ramped platform having an angled incline with an upper surface transitioning into an elongated top surface. Associated with the top surface are supporting members serving the dual role of supporting the vehicle tire above the top surface and for aligning adjustably in receiving grooves, produced by the supporting members, either the tire chain or the tire cable beneath the supported vehicle tire to facilitate the installation process.

2 Claims, 5 Drawing Sheets

TIRE CHAIN AND CABLE MOUNTING APPARATUS

BACKGROUND OF THE INVENTION

1. Field of the Invention

The subject apparatus assists a user in installing snow and ice traction means to a vehicle. Specifically, either chains or cables are fitted within receiving grooves in the subject apparatus and are held in position for applying to a tire supported by the subject apparatus.

2. Description of the Background Art

Vehicle traction means are often attached to tires in cold, wet, and dangerous conditions and locations. Due to the need for a safe and efficient means of installing or mounting traction producing means to a vehicle's tires, numerous associated assistance devices have been created. However, the prior devices are designed and are suitable for the mounting of tire chains only and do not address the option of chains or the newer style traction means of cables.

Disclosed in U.S. Pat. No. 1,067,940 is a device consisting of a rectangular platform, which is placed in front of a vehicle wheel, and a chain which is secured to the platform in a fashion such that spinning the wheel winds the chain about the wheel, drawing the platform towards and under the wheel. The platform contains a groove in the upper surface to accommodate the chain.

U.S. Pat. No. 1,121,869 describes a rectangular platform with a groove in its upper surface sufficiently wide to act as a guide for the vehicle wheel as it passes over the platform, winding the chain about the wheel.

U.S. Pat. No. 1,189,632 relates a tire-chain adjuster that is ramped at both the front and back ends, with the ramps ascending to a hollowed seat in the center to accommodate the tire. The seat has transverse grooves at each end to fit the tire chain.

Presented in U.S. Pat. No. 2,532,149 is a tire chain installer combined with a traction mat, consisting of a rectangular flexible base provided with a separate ramp and platform at opposite ends. A plurality of ridges on both ramp and platform provide traction for the tire, and a hinged block on the platform aids in installing the tire chain.

U.S. Pat. No. 3,893,500 describes a rectangular tire chain installation device with ramps at both ends ascending to a hollowed seat in the center. Within transverse slots in the ramps are spaces for storage of the tire chains oriented in a position such that they are ready to be mounted on the tire.

U.S. Pat. No. 3,937,263 discloses a tire chain container-installation device consisting of two hollow shells which fasten together to form a rectangle, with ramps at each end ascending towards a hollowed central seat containing a transverse groove for the tire chain. The chains are stored in the unassembled hollow shells.

The tire chain applying device related in U.S. Pat. No. 4,031,939 is rectangular with ramped ends ascending to a central seat which contains a removable central member allowing control of the depth of the hollow seat and the number and location of transverse slots for chains.

U.S. Pat. No. 4,103,870 presents a device consisting of a ramp portion and a platform portion hinged together, forming a ramped bed for chain installation when extended, and a compact hollow box (for chain storage) when folded. Both ramp and platform sections have a transverse groove for the chain and a plurality of ridges for traction.

More recently, U.S. Pat. No. 4,194,724 describes a chain mounting device consisting of a wooden block with an inclined ramp at one end and two transverse grooves to accommodate the chains. A modified version of this device contains a warning bell to help prevent the tire from rolling off the platform.

SUMMARY OF THE INVENTION

An object of the present invention is to provide a ramped platform apparatus to facilitate installation of traction devices on vehicle tires.

Another more specific object of the present invention is to produce a ramped platform device with transverse tire support members positioned so that either tire cables or tire chains can be mounted on the same device.

A further object of the present invention is to provide a ramped platform device with a plurality of traction producing projections which, together with the transverse grooves created by the tire support members, will aid vehicle tires in ascending the ramp and remaining firmly seated during cable or chain installation.

Related is a mounting apparatus for installment of a tire chain or a tire cable onto a tire of a vehicle to increase traction of the tire on a road. Comprising the subject invention is an elongated platform having a first end, a second end, opposing side borders, a top surface, and a bottom surface. A ramp having a low first end, a high second end, opposing side borders, a sloping upper surface, and a lower surface, is associated by the ramp high second end with the platform first end. Generated is a ramped platform in which the platform top surface and the ramp upper surface form an essentially continuous vehicle supporting surface. A plurality of tire support members are affixed to the platform top surface. A first groove is produced between a pair of tire support members for receiving a series of cross-links in the tire chain. Further, a second groove is produced between a pair of the of tire support members for receiving adjustable a cross-cable element in the tire cable. The second groove is too narrow to receive a series of cross-links in the tire chain. Preferably, a plurality of traction producing projections are associated with the ramp upper surface.

Other objects, advantages, and novel features of the present invention will become apparent from the detailed description that follows, when considered in conjunction with the associated drawings.

DESCRIPTION OF THE PREFERRED EMBODIMENT

Figure 1:
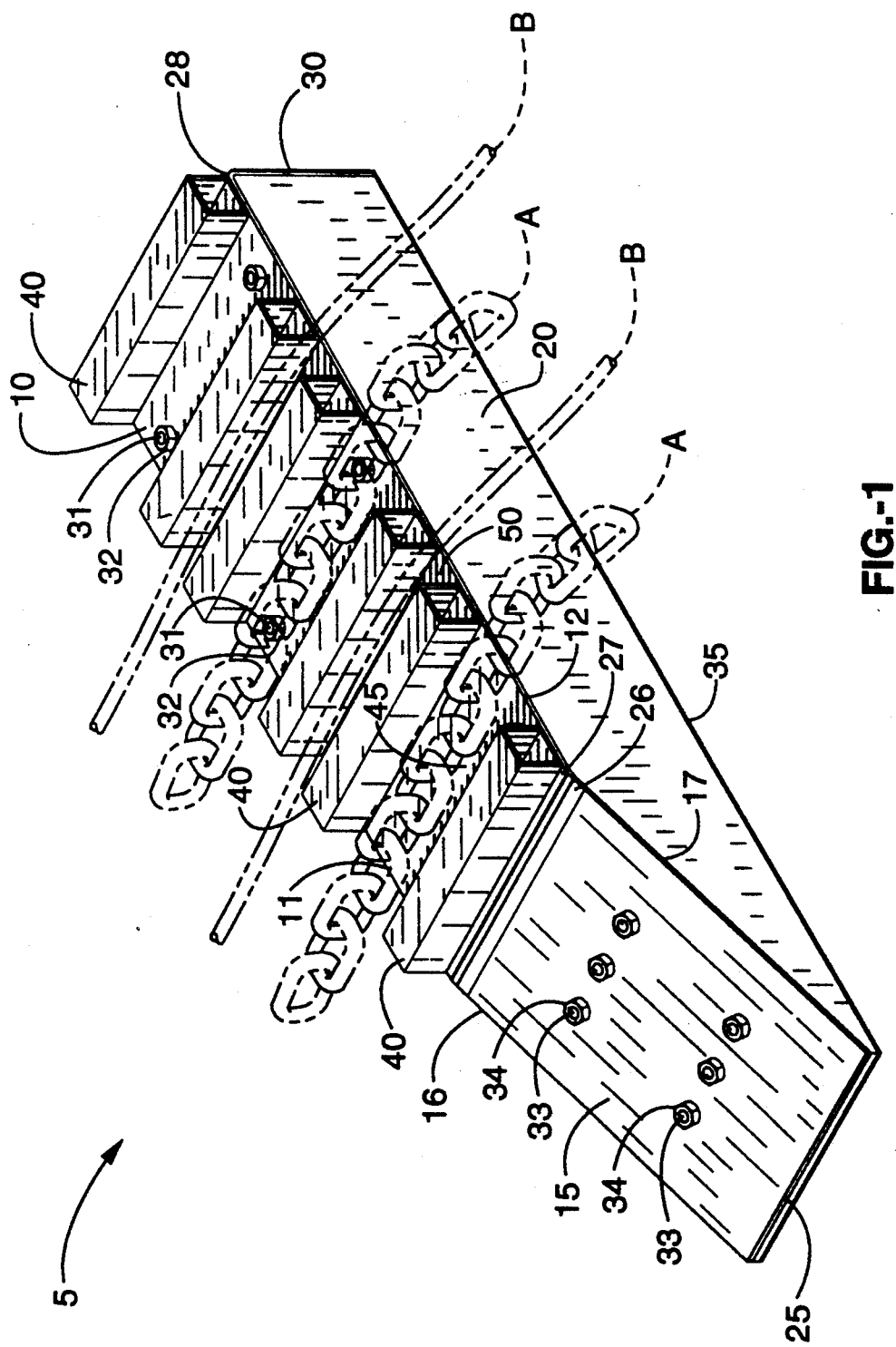
FIG. 1 is a perspective view of the subject invention.
Figure 2:
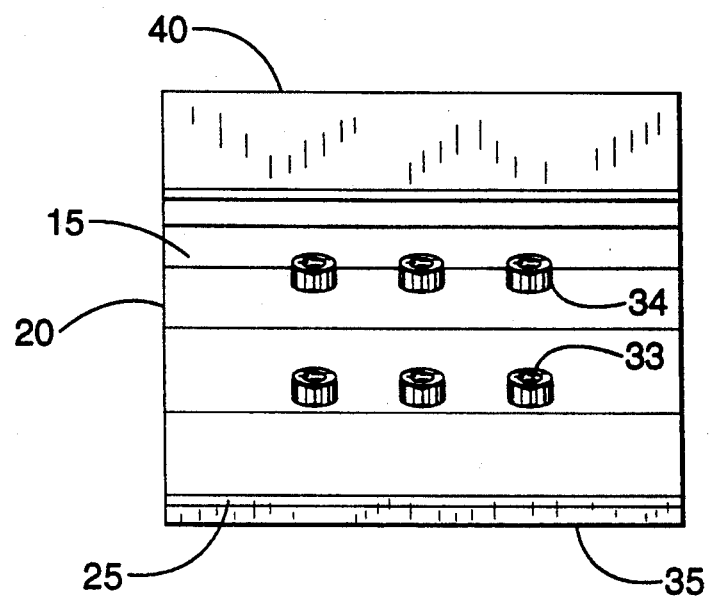
FIG. 2 is a front view of the subject invention.
Figure 5:
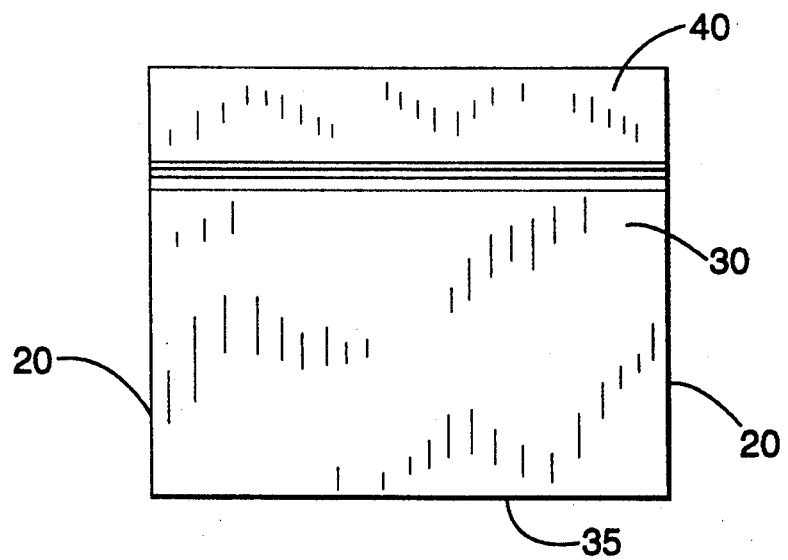
FIG. 5 is a rear view of the subject invention.
Figure 3:
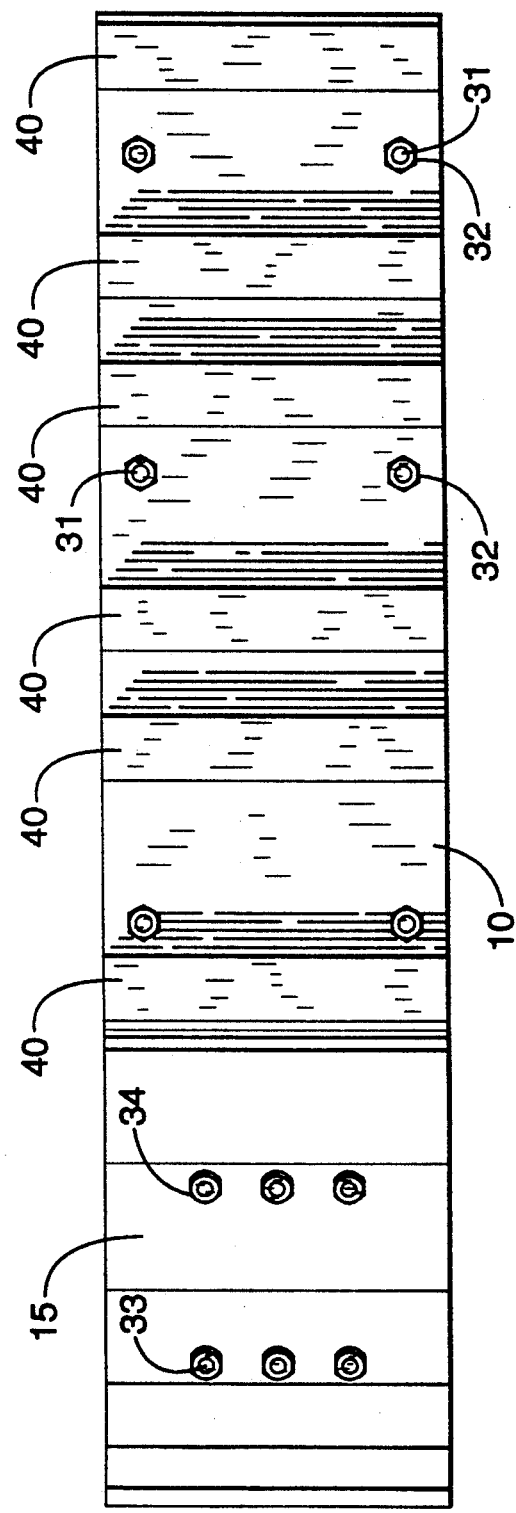
FIG. 3 is a top view of the subject invention.

Referring now to FIGS. 1-6, there is shown a preferred embodiment of a mounting apparatus 5 for installing either a tire chain A or tire cable B onto a tire of a vehicle. Comprising the subject invention is a ramped platform having an elongated top surface 10, often generally planar, with two opposing side borders 11 and 12 transitioning into an angled incline or ramp with an upper surface 15 and two opposing side borders 16 and 17. Beneath the platform's top surface (usually a metal plate) 10 and the ramp's upper surface (usually a metal plate) 15 is a supporting body with side walls 20 and an end wall (usually a metal plate) 30. The side walls are usually about parallel to one another, but other alignment relationships are considered to be within the realm of this disclosure. Usually, the end wall 30 is an extension of the platform's upper surface that bends over the supporting body. The platform top surface 10 is secured to the supporting body by standard means, including welding, gluing, bolting and the like. Depicted in the figures is a carriage bolt 31 to nut 32 arrangement. Likewise, the ramp upper surface 15 is secured to the supporting body by suitable means such as the illustrated carriage bolt 33 to nut 34 system. Further, the subject device may not require the securing of the ramp 15 or platform 10 surface members to the supporting body if the subject device is formed as a unitary object in which no separation exists between the materials of the body and the platform top surface 10 and ramp upper surface 15.

Although the subject invention can be viewed as the single unit described above, another reference view is to picture the device as comprising a ramp portion coupled to a platform portion. Usually, the ramp portion of the subject invention has a low first end 25 and a high, or at least higher than the first end, second end 26 that transitions into or associates with the platform's top surface 10 at a first end 27 to generate an essentially continuous vehicle supporting surface. Therefore, the platform comprises the first end 27, a second end 28, opposing side borders 11 and 12, and a bottom surface 35. The lower portion of the ramp and the platform are continuous or essentially continuous with one another and form the noted bottom surface 35. The angle of the ramp is not critical, but is generally between about 10° and about 80° and more generally between about 20° and about 70°, relative to the sloping upper surface 15 angled up from the underlying ground.

Figure 4:
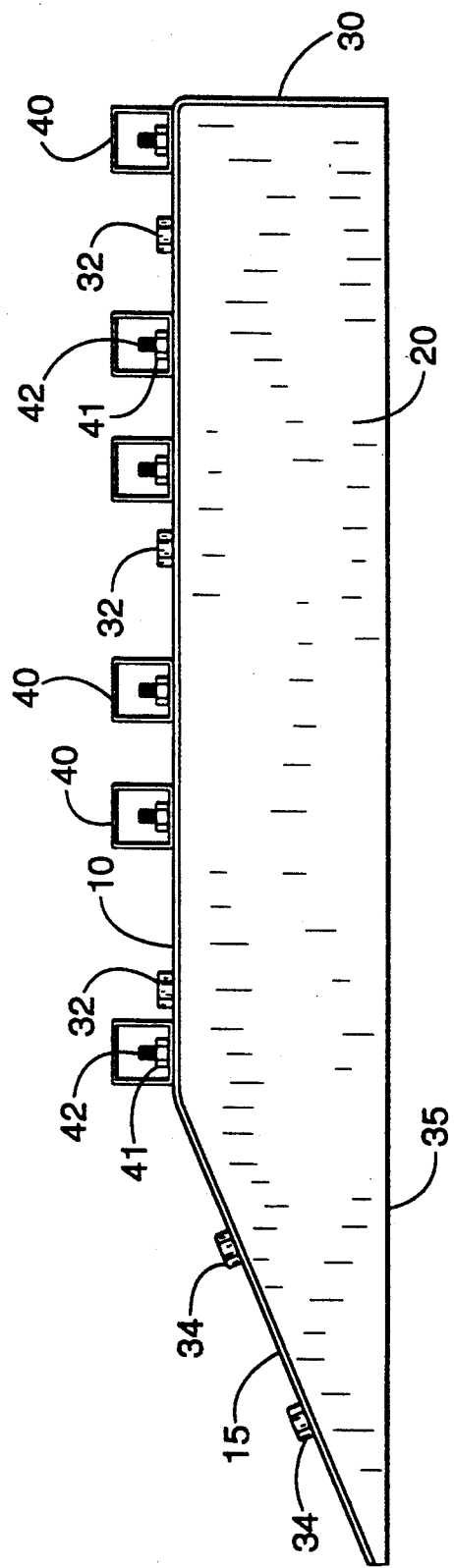
FIG. 4 is a side view of the subject invention.
Figure 6:
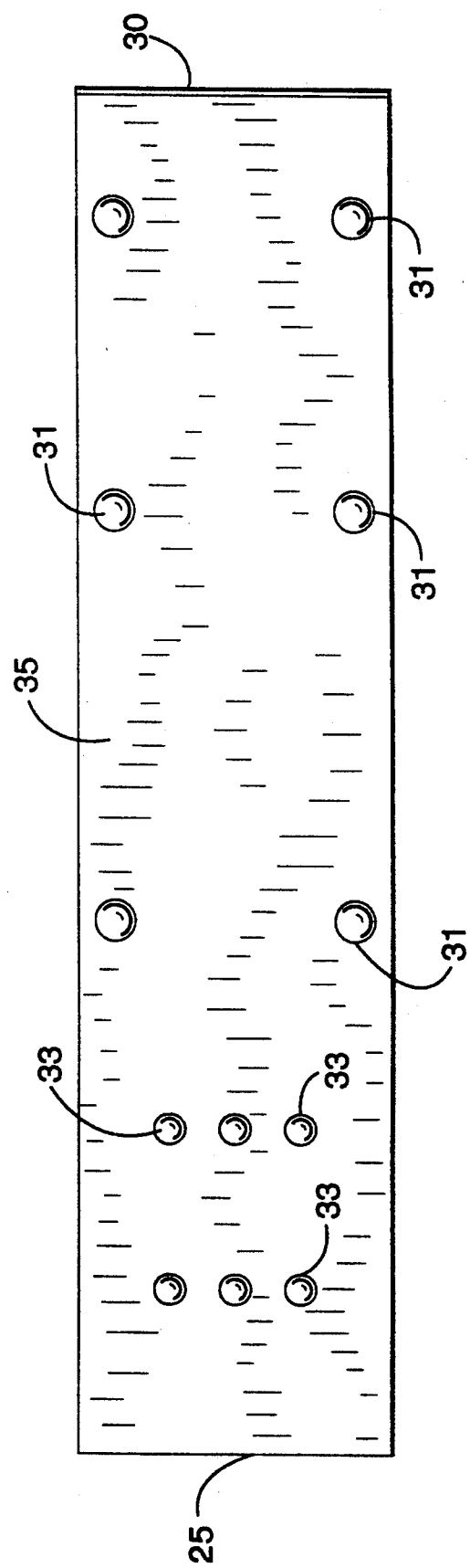
FIG. 6 is a bottom view of the subject invention.

To facilitate the installation of either a set of tire chains or cables to a tire, associated with the platform's top surface 10 are means for supporting a vehicle tire above the top surface 10 and for aligning adjustably either the tire chain or the tire cable beneath the supported tire. The supporting and aligning means comprises a plurality of elongated supports 40. Each elongated support 40 is secured to the top surface 10, essentially spanning between the top surface opposing borders 11 and 12. The securing means includes welding, continuous formation, bolting, and the like. Seen in FIG. 4 are a nut 41 and bolt 42 combination for securing each elongated support. The transverse support members 40 shown here are hollow rectangular tubes fastened onto the top surface 10. The support members 40 are of any suitable configuration including rounded or triangular in shape as well as rectangular, and may be solid as well as hollow. The vehicle tire, after ascending the front ramp surface 15, ultimately rests on the tops of the support members 40 while the chains or cables are attached to the tire.

The plurality of support members 40 are secured and spaced along the top surface 10 to create, between paired support members 40, a first transverse wide groove 45 to accommodate and receive a series of cross-links of the tire chains A, and a second narrow groove 50 to receive the cross-cable element of tire cables B. Although only three first grooves 45 and two second grooves 50 are illustrated in the figures, more or less of each one are possible. Each first groove 45 has a width adapted to receive adjustably the cross-links of the tire chains A. Adjustable in the sense that when the tire is supported over the members 40 enough room exists to easily manipulate the chains for fitting around the tire. Likewise, each second groove 50 is adapted to receive adjustably the cross-cable element B and is too narrow to receive a series of cross-links in a tire chain A. To limit the bending or flexing of a cross-cable on a set of cables while fitting onto a tire, a narrow groove 50 is needed to work efficiently with the cables, especially when larger cable are involved for fitting onto a truck or bus tire. Placing a cross-cable into a wider groove complicates the fitting process by allowing the cable too much freedom. By providing both narrow 50 and wide 45 grooves the same device is able to be utilized with either chains or cables.

For increasing the ease of positioning a tire on the subject apparatus, traction means are provided on the ramp surface 15. Preferably, a plurality of traction producing projections are associated with the ramp's upper surface 15. As depicted, the securing bolts 33 and nuts 34 serve a dual role of attachment and traction.

The apparatus 5 is fabricated from suitable materials that withstand vigorous usage under severe winter conditions involving of water, snow, ice, gravel, sand, and low temperatures. Generally, the platform surface 10, the ramp surface 15, and the end wall 30 are constructed from steel or other like metal as a continuous plate or sheet that is bent into a correct form and mounted over the supporting body. The supporting body is produced from wood, metal, or natural or synthetic polymers and combinations of like materials, usually wood. Additionally, the entire subject device may be fabricated as a single unit from metals, polymers, and the like by standard techniques.

The invention has now been explained with reference to specific embodiments. Other embodiments will be suggested to those of ordinary skill in the appropriate art upon review of the present specification.

Although the foregoing invention has been described in some detail by way of illustration and example for purposes of clarity of understanding, it will be obvious that certain changes and modifications may be practiced within the scope of the appended claims.

What is claimed is:

1. A mounting apparatus for installing either a tire chain or a tire cable onto a tire of a vehicle to increase traction of the tire on a road, comprising:
   a) an elongated platform having a first end, a second end, opposing side borders, a top surface, and a bottom surface;
   b) a ramp having a low first end, a high second end, opposing side borders, a sloping upper surface, and a bottom surface, wherein said ramp high second end attaches to said platform first end to generate a ramped platform; and
   c) means for supporting said vehicle tire above said top surface and for aligning adjustably either said tire chain or said tire cable beneath said supported vehicle tire to facilitate said installation, wherein said supporting and aligning means comprises a plurality of elongated supports with each said elongated support secured to said top surface and essentially spanning between said top surface opposing borders to generate first and second grooves between pairs of said elongated supports, wherein said second groove is adapted to receive adjustably a cross-cable element in said tire cable and said second groove is too narrow to receive a series of cross-links in said tire chain.

2. A mounting apparatus for installing either a tire chain or a tire cable onto a tire of a vehicle to increase traction of the tire on a road, comprising:
  a) an elongated platform having a first end, a second end, opposing side borders, a generally planar top surface, and a bottom surface;
  b) a ramp having a low first end, a high second end, opposing side borders, a sloping upper surface, and a bottom surface, wherein said ramp high second end attaches to said platform first end to generate a ramped platform in which said platform top surface and said ramp upper surface form an essentially continuous vehicle supporting surface;
  c) a plurality of tire support members affixed to said platform top surface;
  d) a first groove produced between a first and a second said tire support members for receiving adjustably a series of cross-links in said tire chain; and
  e) a second groove produced between said second and a third said tire support members for receiving adjustably a cross-cable element in said tire cable, wherein said second groove is too narrow to receive a series of cross-links in said tire chain.

* * * * *